Sept. 22, 1964 F. J. WITT 3,150,326

VARIOLOSSER CIRCUITS HAVING IDENTICAL FREQUENCY SELECTIVITY AT ALL LOSS SETTINGS

Filed March 9, 1961 4 Sheets-Sheet 1

INVENTOR.
F. J. WITT
BY E. J. Oluder
ATTORNEY

INVENTOR.
F. J. WITT
BY [signature]
ATTORNEY

INVENTOR.
F. J. WITT
BY E. J. Oluler
ATTORNEY

INVENTOR.
F. J. WITT
BY E. J. Cluider
ATTORNEY

United States Patent Office 3,150,326

Patented Sept. 22, 1964

3,150,326

VARIOLOSSER CIRCUITS HAVING IDENTICAL FREQUENCY SELECTIVITY AT ALL LOSS SETTINGS

Francis J. Witt, Summit, N.J., assignor to Bell Telephone Laboratories, Incorporated, New York, N.Y., a corporation of New York Filed Mar. 9, 1961, Ser. No. 94,493
17 Claims. (Cl. 330—21)

This invention relates to transmission networks, and more particularly to variolosser networks employing reactive circuit elements. Its general object is to stabilize the frequency response characteristics of such networks.

A variolosser is a transmsision network whose loss is variable. Typically, the amount of loss introduced is electronically controlled from an external source. Such circuits find application, for example, in compressors, expanders, loss equalizers and automatic gain control arrangements.

Conventional practice in the design of variolossers is to construct a resistive attenuator which employs a voltage sensitive resistance device, such as a varistor or a thermistor, for example, as one or more of the elements of the network. If the network does not contain reactive elements or work into reactive terminations, the frequency response of the over-all network remains constant while the resistance of the variable element, or elements, is varied. Even when reactive components are present, their effect on frequency response is slight and may generally be ignored so long as the transmission frequency in the network is relatively low. At relatively high frequencies, however, reactive components are greatly magnified and their effect on frequency response must be taken into account. More specifically, at high frequencies the frequency response of a conventional variolosser is dependent on the magnitude of the loss level and each different setting of the variolosser results in a respective frequency response charactertistic. An obvious solution to the problem is to employ suitably designed equalizing networks to compensate for frequency response variations. This approach, however, requires the introduction of additional circuit elements with an attendant increase in circuit complexity and a reduction of signal power.

A specific object of the invention, therefore, is to maintain the frequency response of a variolosser network which includes reactances invariant with respect to the magnitude of the loss level of the network.

Another object of the invention is to maintain the frequency response of a variolosser at a constant level over a relatively wide range of frequencies, irrespective of the loss setting of the network and irrespective of the presence of reactive components without resort to additional equalizing or compensating networks.

These and other objects are attained in accordance with the principles of the invention by a variolosser network which includes an input circuit, an output circuit and a connecting variable resistance in either shunt or series relation thereto. Elements of the input circuit, which include at least one reactive element, and elements of the output circuit which also include at least one reactive element, are so connected and so interrelated in terms of magnitude and kind that the admittances or impedances of the input and output circuits as seen from the connecting variable resistance are complementary. Stated otherwise, in a network in accordance with the invention, the output admittance or impedance of the input circuit is complementary to the input admittance or impedance, respectively, of the output circuit, as seen from an interconnecting variable resistance. More briefly, the circuits themselves are described herein as "complementary." In such a network the over-all frequency response remains fixed irrespective of changes in the magnitude of the variable resistance.

The principles of the invention are not restricted to any particular circuit form but instead find application in any one of a wide variety of circuit combinations. Thus, for example, in one form of the invention the input circuit includes a shunt capacitor and a series resistor and the output circuit includes a series resistor and a shunt inductor. The connecting variable resistance, which may be a varistor, for example, is also in shunt. In this instance a low-pass current transfer frequency characteristic is attained which is entirely independent of the magnitude of the variable resistance.

Other forms of the invention stem from appropriate selection and connection of resistive and reactive elements in the input and output circuits and the interconnection of these circuits by a variable resistance, either in series or shunt relation. These forms of the invention afford a variety of frequency response characteristics, but the form of each, however, is invariant with respect to changes in the magnitude of the variable resistance. In each form of the invention the selection of circuit elements in terms of kind and magnitude is governed by the requirement of complementary admittances or impedances.

Accordingly, one feature of the invention is a variolosser network having a single shunt variable resistance connecting input and output circuits having complementary admittances as seen from the variable element, which impedances include reactance.

Another feature of the invention is a variolosser network having a single series variable resistance connecting input and output circuits having complementary impedances as seen from the variable resistance element, which impedances include reactance.

A further feature of the invention is an automatic gain control network, characterized by a fixed frequency response, which network employs a shunt varistor as the controlling circuit element in combination with complementary input and output circuits which include reactance.

The principles of the invention and additional objects and features thereof will be fully apprehended from the following detailed description of certain illustrative embodiments presented with reference to the drawing in which.

Figure 1A:
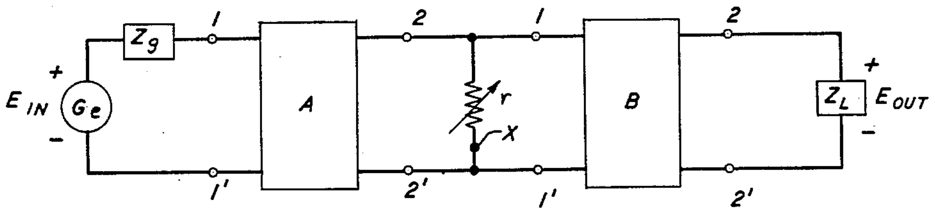
FIGS. 1A, 1B, 2A and 2B are network block diagrams illustrating general forms of basic networks in accordance with the invention.

Consideration of the salient aspects of network theory underlying the principles of the invention is essential for a complete understanding of the relation between various forms of the invention. FIG. 1A shows a first network A and a second network B each having respective input points conventionally designated 1 and 1' and output points 2 and 2'. A generator $G_e$ with an open circuit output and an internal impedance $Z_g$ is applied across the input of network A. Networks A and B are directly coupled and a resultant output voltage $E_{OUT}$ appears across a load impedance $Z_L$. A variable shunt resistance $r$ is connected at the interconnection of the two networks. In FIG. 1A and in all subsequent figures it is to be understood that a variable resistance $r$ is intended as illustrative of any variable resistance element, such as a varistor, for example.

An analysis of the properties of the networks A and B is required to determine network conditions such that only the level of the over-all transmission $$T=\frac{E_{OUT}}{E_{IN}}$$

is affected when the resistance $r$ is varied. Stated otherwise, network conditions are desired which lead to an over-all network frequency response that is invariant with respect to the magnitude of the resistance $r$. The transmission T may be expressed conventionally in terms of the quotient of two polynomials $N(p)$ and $D(p)$ in the following form:

$$T(p)=\frac{N(p)}{D(p)}=\frac{a_np^n+a_{n-1}p^{n-1}+a_{n-2}p^{n-2}+\ .\ .\ .\ +a_{1p}+a_0}{b_mp^m+b_{m-1}p^{m-1}+b_{m-2}p^{m-2}+\ .\ .\ .\ +b_{1p}+b_0}, \qquad (1)$$

where $(p)$ is the conventional complex frequency variable. By fractoring the polynomials, Equation 1 may be expressed in the form $$T(p)=\frac{N(p)}{D(p)}=\frac{K(p-z_1)(p-z_2)(p-z_3)\ .\ .\ .\ (p-z_n)}{(p-p_1)(p-p_2)(p-p_3)\ .\ .\ .\ (p-p_m)} \qquad (2)$$

where $z_1, z_2, z_3\ .\ .\ .\ z_n$ are the roots of $N(p)$, conventionally termed "zeros" of T, where $p_1, p_2, p_3\ .\ .\ .\ p_m$ are the roots of $D(p)$, conventionally termed "poles" of T and where K is a constant. Conditions for the elimination of $r$ as a factor in the determination of network frequency response may be approached by an examination of the poles and zeros of T.

Figure 1B:
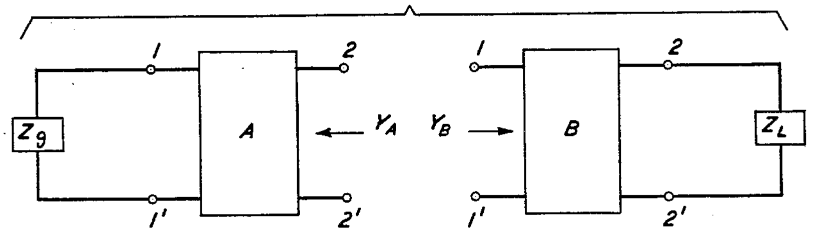

First, the poles of T are considered. The poles of T are the natural frequencies of the over-all network. Accordingly, the characteristics of the network for the existence of a pole may be defined in terms of a short circuit or zero impedance condition. If a constant voltage generator is inserted at point X, in FIG. 1A, the desired impedance relation, looking away from that generator may be defined as $$r+\frac{1}{Y_A(p)+Y_B(p)}=0 \qquad (3)$$

where $Y_A$ and $Y_B$ are the admittances indicated in FIG. 1B, and where $r$ is the combined resistance of the networks A and B. The roots of Equation 3, considered as an equation in $p$, are the poles of T. As with T, $Y_A$ and $Y_B$ may each be defined as the quotient of a respective polynominal pair so that $$Y_A(p)+Y_B(p)=\frac{N_A}{D_A}+\frac{N_B}{D_B}=\frac{N_AD_B+N_BD_A}{D_AD_B} \qquad (4)$$

It therefore follows that the roots of $N_AD_B+N_BD_A$ are the zeros of $Y_A+Y_B$ and the roots of $D_AB_B$ are the poles of $Y_A+Y_B$. Substitution of the identity 4 in Equation 3 leads to the expression $$r(N_AD_B+N_BD_A)+D_AD_B=0 \qquad (5)$$

From Equation 5, if the poles of $Y_A+Y_B$ are the same as the zeros of $Y_A+Y_B$, then the poles of T, which are in effect defined by Equation 3 are necessarily independent of $r$. Stated otherwise, if $Y_A$ and $Y_B$ are complementary admittances, i.e., if $$Y_A(p)+Y_B(p)=G \qquad (6)$$

where G is a constant, then the poles of T are independent of $r$.

A somewhat different type of analysis is required to show that, in the general case, the zeros of T are also independent of $r$. If networks A and B are ladder networks, the zeros of T may readily be concluded to be independent of $r$. This statement follows from the fundamental principle that the zeros of transmission of a ladder network are the zeros of the shunt impedances and the poles of the series impedances. Inasmuch as these zeros and poles of impedance are independent of $r$, the zeros of T are also necessarily independent of $r$.

That the zeros of T are independent of $r$ in general may be shown from the fact that irrespective of the particular form of the networks A and B, equivalent pi or T networks may be substituted therefor; these equivalent networks are ladder networks. The fact that in a particular case a branch of an equivalent ladder network might be identified with an unrealizable impedance does not affect the validity of the conclusion.

It may therefore be concluded as a principle of the invention that if the relation $$Y_A(p)+Y_B(p)=G \qquad (6)$$

is satisfied in a general case network of the form shown in FIG. 1A, both the poles and the zeros of T are independent of $r$, which is to say that the over-all frequency response of the network is immune to variations in the magnitude of $r$.

The design of practical networks embodying the principles of the invention requires the determination of one admittance, $Y_B$ for example, when the other, $Y_A$, is given so that Equation 6 is satisfied. Network synthesis in terms of complementary admittances, a subject well covered in the literature (see, for example, Guillemin's "Synthesis of Passive Networks," John Wiley & Sons, 1957) shows that the necessary and sufficient conditions on $Y_A$ for $Y_B$ to be a positive real and hence realizable admittance function are that $Y_A$ must be a positive real function and must be a minimum susceptance function, i.e., $Y_A$ can have no poles on the $j\omega$ axis. Further, the real part of $Y_A(j\omega)$ must, at a maximum, be less than or equal to the constant conductance term G of Equation 6.

In terms of practical circuit design, the restrictions imposed by the foregoing conditions are negligible. For example, given an admittance function $Y_A$ with no poles on the $j\omega$ axis, the determination of a complementary function $Y_B$ is relatively simple. The conductance term G is made sufficiently large to meet the final condition stated in the preceding paragraph and $Y_B$ may be defined as follows:

$$Y_B(p)=G-Y_A(p) \qquad (7)$$

Figure 2A:
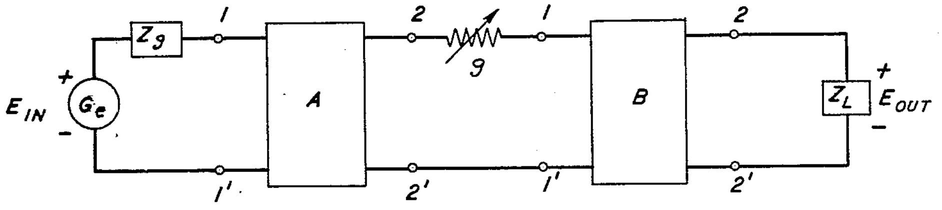
Figure 2B:
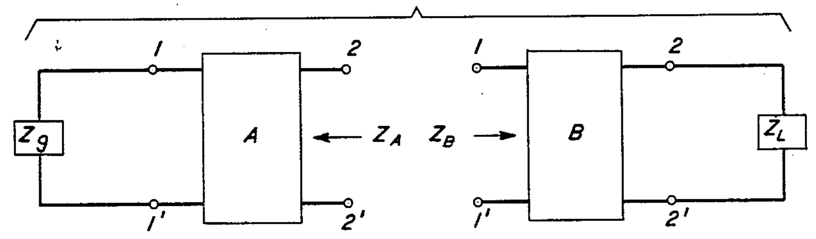

Thus far the principles of the invention have been discussed only in terms of a variolosser network employing a variable shunt impedance. In accordance with another aspect of the invention the principle of complementary networks, as defined above, may be applied to a variolosser network of the general form shown in FIG. 2A in order to attain over-all frequency response characteristics that are independent of the magnitude of a series conductance $g$. In this instance the poles of T are the roots of $$g+\frac{1}{Z_A(p)+Z_B(p)}=0 \quad (8)$$

where $Z_A$ and $Z_B$ are the impedances indicated in FIG. 2B. Using the same reasoning applied in the analysis of the shunt variable element case illustrated in FIG. 1A, it may be shown that if $Z_A$ and $Z_B$ are complementary impedances so that $$Z_A(p)+Z_B(p)=R \quad (9)$$

where R is a constant, the poles and zeros of T, and hence the over-all frequency response of the network, are immune to variations in the magnitude of the series conductance, or resistance. Principles and techniques of investigating complementary impedances are substantially identical to those demonstrated in the discussion of complementary admittances.

Figures 3A, 3B, 4A, 4B, 5A, 5B:
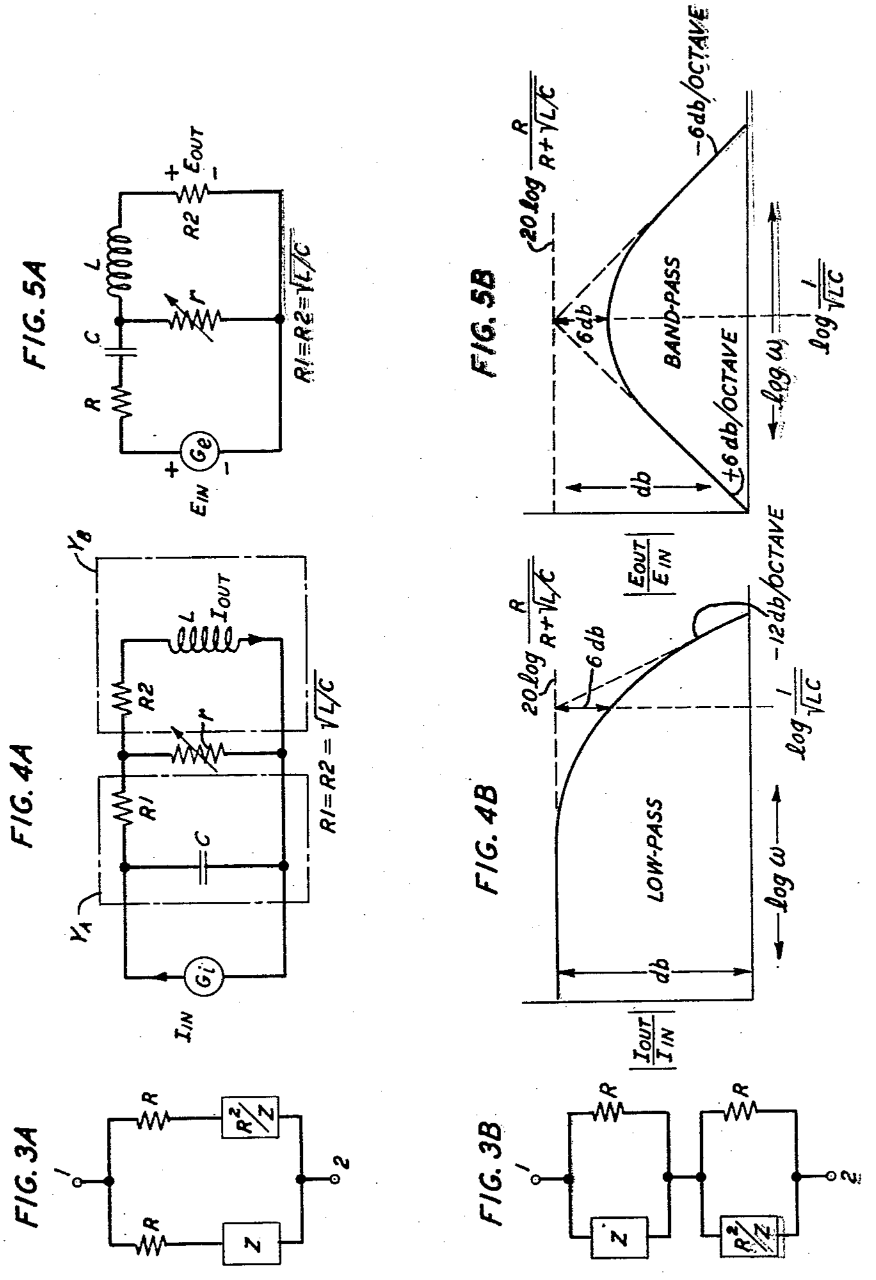
FIGS. 3A and 3B are schematic circuit diagrams illustrating the admittance or impedance relations of circuitry embodying the principles of the invention.
FIG. 4A is a schematic circuit diagram of a first type of variolosser in accordance with the invention.
FIG. 4B is a plot of the frequency response of the circuit shown in FIG. 4A.
FIG. 5A is a schematic circuit diagram of a second type of variolosser in accordance with the invention.
FIG. 5B is a plot of the frequency response of the circuit shown in FIG. 5A.

The two general networks shown in FIGS. 3A and 3B are useful as bases for deriving specific variolosser network circuitry embodying the principles of complementary admittances and complementary impedances. FIG. 3A is generally illustrative of the shunt resistance case shown in FIG. 1A. The circuit includes a first branch having a resistance R in series with an impedance Z in parallel with a second branch with a resistance R in series with impedance $R^2/Z$. FIG. 3B is generally illustrative of the series resistance case shown in FIG. 2A. The circuit includes a first parallel combination of a resistance R and an impedance Z in series with a second parallel combination of a resistance R and an impedance $R^2/Z$. For both of the circuits of FIG. 3A and FIG. 3B straightforward circuit analysis shows that the over-all impedance in each case is simply equivalent to a resistor of resistance magnitude R, which is of course entirely independent of frequency.

A specific variolosser circuit derived from the general case of FIGS. 1A and 3A is shown in FIG. 4A. The admittances $Y_A$ and $Y_B$, corresponding to the admittances $Y_A$ and $Y_B$ of FIG. 1B, include the circuit elements within the respective broken line boxes. Specifically, the admittance $Y_A$ results from the combination of a series resistor R1 and a shunt capacitor C. The admittance $Y_B$ results from a series resistor R2 and a shunt inductor L. Input current $I_{IN}$ is supplied from a current generator $G_i$. Conventional circuit analysis shows that the requirement for $Y_A$ and $Y_B$ to be complementary is satisfied if $$R_1=R_2=\sqrt{\frac{L}{C}} \quad (10)$$

The frequency response of the circuit of FIG. 4A is shown in FIG. 4B by a log scale plot of the magnitude of the current ratio $$\frac{I_{OUT}}{I_{IN}}$$

versus frequency $\omega$, where $I_{OUT}$ is the current through the inductor L. As shown, a low-pass frequency characteristic is attained at a level defined by $$20 \log \frac{R}{R+\sqrt{\frac{L}{C}}} \quad (11)$$

With respect to the loss at low frequencies, an attenuation of 6 db occurs at a frequency corresponding to $1/\sqrt{LC}$ and attenuation then approaches −12 db per octave as the frequency increases. In accordance with the invention, the shape of the frequency response curve is entirely independent of the variable resistance $r$.

Another form of the invention is illustrated by the variolosser circuit of FIG. 5A. In this instance resistor R1, capacitor C and inductor L are series elements and voltage generator $G_e$, variable resistor $r$ and resistor R2 are shunt elements. Voltage generator $G_e$ applies a voltage $E_{IN}$ and an output voltage $E_{OUT}$ is taken across resistor R2. Again the magnitudes of the circuit elements are as defined by the relation 10.

The frequency response curve of the circuit of FIG. 5A, illustrated in FIG. 5B, shows that a band-pass characteristic is attained. The form of the response curve is again independent of the magnitude of the resistance $r$.

Figure 6A:
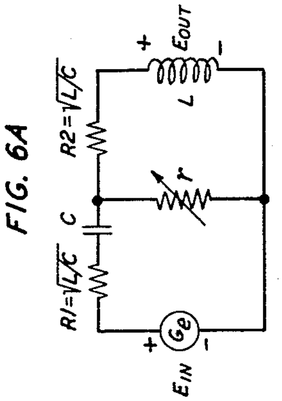
FIG. 6A is a schematic circuit diagram of a third type of variolosser in accordance with the principles of the invention.
Figure 6B:
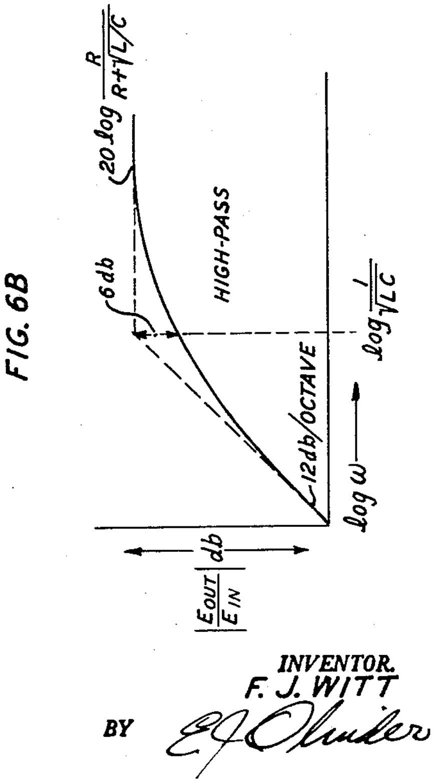
FIG. 6B is a plot of the frequency response of the circuit shown in FIG. 6A.

Another variolosser circuit embodying the principles of the invention is shown in FIG. 6A. This circuit is identical to the circuit shown in FIG. 5A with the exception that the circuit positions of the inductor L and the resistor R2 have been interchanged. As shown in FIG. 6B, a high-pass frequency response is attained, and once again the form of the curve is independent of the resistance $r$.

Figure 7A:
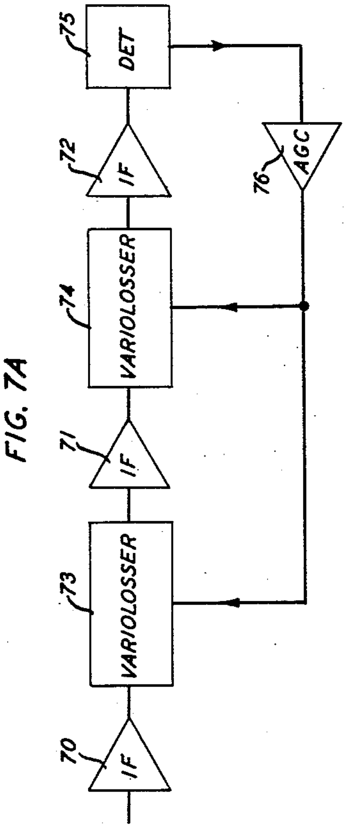
FIG. 7A is a block diagram of a multistage amplifier employing variolossers in accordance with the invention as automatic gain control circuits.
Figure 7B:
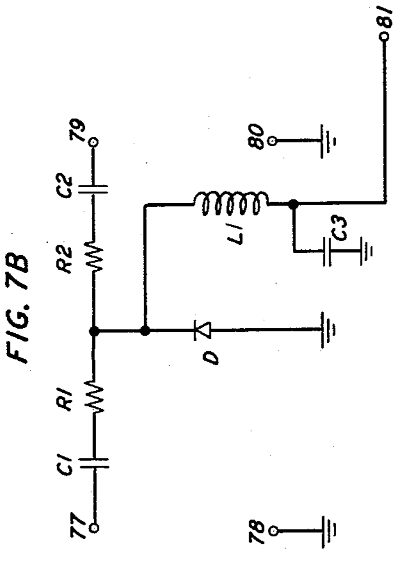
FIG. 7B is a schematic circuit diagram of one of the variolossers of FIG. 7A.

The forms of the invention considered up to this point have all included reactive devices as integral parts of the variolosser networks. Another aspect of the invention is that the principle of complementary networks may also be applied by taking into account the magnitude of the reactive components in each of two circuits to which a variolosser is coupled. In this instance, in accordance with the invention, the magnitudes of the resistive components in the variolosser circuit proper are tailored in accordance with the magnitudes of the reactive components of the adjacent circuits. FIGS. 7A and 7B are illustrative.

FIG. 7A is a block diagram of a three-stage IF amplifier with automatic gain control. Arrangements of this general form are shown, for example, by V. R. Saari in U.S. Patent 3,119,077, issued January 21, 1964. A variolosser 73 introduces a controlled loss between the output of amplifying stage 70 and the input of amplifying stage 71. A second variolosser 74 introduces a controlled loss between the output of amplifying stage 71 and the input of amplifying stage 72. The output of amplifying stage 72 is detected by a detector 75 whose output is in turn applied to each of the variolossers 73 and 74 by way of an automatic gain control amplifier 76. The impedance of the amplifying stage 71, as seen from the variolosser 74, includes a capacitive component. Similarly, it is assumed that the impedance of amplifying stage 72, as seen from the variolosser 74, includes an inductive component.

The specific utilization of the output of the AGC amplifier 76 in a variolosser in accordance with the invention is shown in FIG. 7B. The output from amplifying stage 71 (FIG. 7A) is applied to input terminals 77 and 78. The magnitudes of resistors R1 and R2 are selected to conform to the circuit relation implied in the circuit of FIG. 3A. Capacitors C1 and C2 are coupling devices and the impedance of each is negligible at the lowest frequency of interest. The diode D is the variable resistance element and its reactive components in the frequency range of interest are also negligible. Point contact diodes and alloy junction diodes have suitable characteristics for this purpose. The output from the AGC amplifier 76 (FIG. 7A) is introduced at terminal 81 and is applied to bias diode D by way of inductor L1. Inductor L1 is a choke and has a very high impedance at the lowest frequency of interest. Capacitor C3 serves as a decoupling filter. The variolosser 73 of FIG. 7A may also be of the form shown in FIG. 7B, assuming that the nature of the input and output impedances is as described for variolosser 74.

Figure 8:
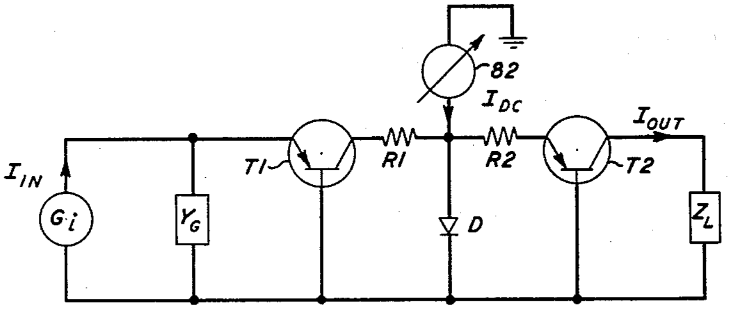
FIG. 8 is a schematic circuit diagram of a variolosser in accordance with the invention, employed as an AGC circuit between two cascaded common base transistor amplifier stages.

A somewhat more detailed example of a variolosser in accordance with the invention which is tailored to take into account the reactive components of adjacent amplifying stages is shown in FIG. 8. A common method of realizing wide-band gain is the use of cascaded common base stages with broadband transformer interstages. The gain of such an amplifier is most effectively varied for automatic gain control purposes by the use of diode variolossers. These variolossers typically employ three or more diodes each and are designed so that their input and output impedances are substantially constant at different loss levels. The circuit combination shown in FIG. 8 is at least as effective and radically simpler than the conventional arrangement described.

Figure 9:
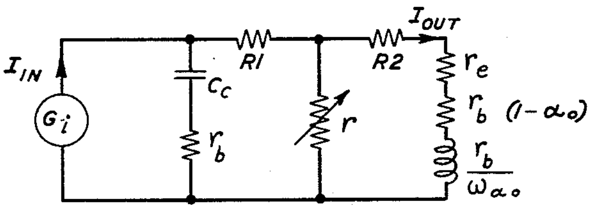
FIG. 9 is a schematic circuit diagram of a high frequency equivalent circuit of the circuit shown in FIG. 8.

In FIG. 8 the source of control current $I_{DC}$ for biasing diode D is schematically illustrated by a variable current generator 82. Transistors T1 and T2, in common base configuration, are coupled through resistors R1 and R2. If admittance $Y_G$ and impedance $Z_L$ can be assumed to be negligibly small, then the high-frequency equivalent circuit shown in FIG. 9, may be used as an aid in computing the resistance values of R1 and R2 in accordance with the principles of the invention. In FIG. 9 the following conventional notations are used:

$r_b$=Equivalent base resistance
$r_e$=Equivalent emitter resistance
$\alpha$=Short circuit current amplification factor
$\alpha_0$=Short circuit current amplification factor at low frequency
$\omega_{\alpha 0}$=Angular frequency at which $|\alpha|$ is reduced by 3 db
$C_c$=Collector capacitance.

As in the case of the circuit shown in FIG. 4A, for example, conventional circuit analysis may be employed to derive the conditions necessary for complementary admittances. These conditions are as follows:

$$R1+r_b=R2+r_e+r_b(1-\alpha_0)=\sqrt{\frac{r_b}{C_c\omega_{\alpha 0}}} \qquad (12)$$

or $$R1=\sqrt{\frac{r_b}{C_c\omega_{\alpha 0}}}-r_b \qquad (13)$$

and $$R2=\sqrt{\frac{r_b}{C_c\omega_{\alpha 0}}}-r_e-r_b(1-\alpha_0) \qquad (13)$$

The relations indicated by Equations 13 and 14 are sufficiently precise to serve as a basis of analysis for any circuit of the general form shown in FIG. 8.

Figure 10:
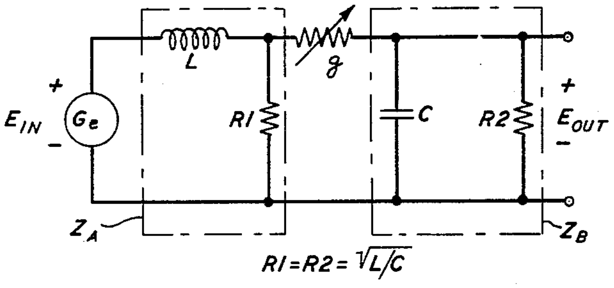
FIG. 10 is a schematic circuit diagram of a variolosser in accordance with the invention employing a single variable series resistance.

Specific circuits discussed thus far fall within the general form illustrated by FIG. 1A in which a variable shunt resistance is employed. FIG. 10 is a variolosser network of the series variable element form, illustrated generally by FIG. 2A. It will be noted that the network of FIG. 10 is the dual of the network shown in FIG. 4A. In FIG. 10 the impedance $Z_A$ is derived from an inductor L and a resistor R1 and the impedance $Z_B$ is derived from a capacitor C and a resistor R2. The connecting variable resistance is a series element *g*. Input voltage $E_{IN}$ is supplied by the voltage generator $G_e$ and output voltage $E_{OUT}$ appears across the resistor R2. Additional networks based on the general configuration of FIG. 2A can be derived by taking the dual of the networks shown in FIGS. 5A and 6A. As indicated above, the principles of the invention are equally applicable to variolosser circuit configurations employing a variable series resistance.

It is to be understood that the above-described arrangements are merely illustrative of the application of the principles of the invention. Numerous other arrangements may be designed by those skilled in the art without departing from the spirit and scope of the invention.

What is claimed is:

1. A variolosser network comprising, in combination, an input circuit having a first plurality of interconnected circuit elements including at least one reactive element of a first kind, an output circuit having a second plurality of interconnected circuit elements including at least one reactive element of an opposite kind, and means comprising a variable resistance interconnecting said input and output circuits, said input and output circuits being complementary as viewed from said interconnecting means, thereby rendering the over-all frequency response of said network invariant with respect to the magnitude of said variable resistance.

2. Apparatus in accordance with claim 1 wherein said variable resistance comprises a varistor in shunt relation to said input and output circuits.

3. Apparatus in accordance with claim 1 wherein said variable resistance comprises a varistor in series relation to said input and output circuits.

4. Apparatus in accordance with claim 2 including an outside signal source and means for varying the resistance of said variable resistance in accordance with the magnitude of signals from said outside source.

5. A variolosser circuit comprising, in combination, a two-terminal current source, first and second resistors of resistance magnitude $R_1$ and $R_2$, respectively, connected in series relation, a variable resistance having one terminal thereof connected to the junction point of said first and second resistors, a capacitor of capacitance magnitude C having one terminal thereof connected to one terminal of said source and to the free terminal of said first resistor, and an inductor of inductance magnitude L connecting the free terminal of said second resistor to the free terminal of said variable resistor to the free terminal of said capacitor and to the free terminal of said source, said resistance magnitudes conforming to the relation $$R_1=R_2=\sqrt{\frac{L}{C}}$$

thereby establishing a low-pass frequency relation between the current from said source and the resulting current through said inductor which relation is independent of the magnitude of said variable resistance.

6. A variolosser circuit comprising, in combination, a two-terminal voltage source, a series circuit combination of a first resistor of resistance magnitude $R_1$, an inductor of inductance magnitude L and a second resistor of resistance magnitude $R_2$ connected in the stated order between the terminals of said source, said magnitudes conforming to the relation $$R_1=R_2=\sqrt{\frac{L}{C}}$$

and a variable resistance element having one terminal thereof connected to the junction of said capacitor and said inductor and the other terminal thereof connected to the junction of said second resistor and of said source, thereby establishing a band-pass frequency relation between the voltage of said source and the resulting voltage across said second resistor that is immune to variations in the magnitude of said variable resistance.

7. A variolosser network comprising, in combination, a two-terminal voltage source, a series circuit combination of a first resistor of resistance magnitude $R_1$, a capacitor of capacitance magnitude C, a second resistor of resistance magnitude $R_2$, and an inductor of inductance magnitude L connected in the stated order between the terminals of said source, said magnitudes conforming to the relation $$R_1=R_2=\sqrt{\frac{L}{C}}$$

and a variable resistance element having one terminal thereof connected to the junction of said capacitor and said second resistor and the other terminal thereof connected to the junction of said inductor and said source, thereby establishing a high-pass frequency relation between the voltage of said source and the resulting voltage across said inductor that is invariant with respect to the magnitude of said variable resistance.

8. A variolosser circuit for automatically controlling the gain of a multi-stage transistor amplifier, said amplifier including first and second transistors in common base circuit configuration, each including respective base, emitter and collector electrodes, said circuit comprising, in combination, a first resistor and a diode in series relation connected between the collector and base electrodes of said first transistor, a second resistor and said diode in series relation connected between the emitter and base electrodes of said second transistor, and means for applying a variable control current to the junction of said resistors and to said diode thereby to bias said diode and control the introduction of loss between the collector of said first transistor and the emitter of said second transistor, the resistance magnitude of each of said resistors being such that the circuit admittance as viewed from the terminals of said diode in a first direction is complementary to the circuit admittance as viewed from the terminals of said diode in the opposite direction, thereby rendering the frequency response of said amplifier independent of the magnitude of said loss.

9. A variolosser circuit for automatically controlling the gain of a multi-stage transistor amplifier, said amplifier including first and second transistors in common base circuit configuration each including respective base, collector and emitter electrodes, said circuit comprising, in combination, first and second resistors in series relation connected between the collector of said first transistor and the emitter of said second transistors, a source of variable control current, and circuit means connected between the junction point of said resistors and the common base connection of said transistors responsive to said control current for introducing a variable loss between the collector of said first transistor and the emitter of said second transistor, the resistance magnitude of each of said resistors being such that the circuit admittance as viewed in one direction from said circuit means is complementary to the circuit admittance as viewed from said circuit means in an opposite direction, thereby rendering the frequency response of said amplifier independent of the magnitude of said loss.

10. Apparatus in accordance with claim 9 wherein said circuit means comprises a shunt-connected diode.

11. A variolosser network comprising, in combination, an input circuit including a first circuit element having an inductance magnitude L in parallel relation with a second circuit element having a resistance magnitude R1, an output circuit including a third circuit element having a capacitive magnitude C in parallel relation with a fourth circuit element having a resistance magnitude R2, a variable resistance circuit element having one terminal thereof connected to one junction point of said first and second elements and the second terminal thereof connected to one junction point of said third and fourth elements, and means connecting the other junction point of said first and second elements to the other junction point of said third and fourth elements, said magnitudes of said first, second, third and fourth elements conforming to the relation $$R_1=R_2=\sqrt{\frac{L}{C}}$$

thereby rendering the frequency response of said network immune to variations in the resistance magnitude of said variable resistance.

12. Apparatus in accordance with claim 11 wherein said variable resistance comprises a varistor.

13. A variolosser network comprising, in combination, a first circuit including a resistive circuit element of resistance magnitude R1 and an inductive circuit element of inductance magnitude L, a second circuit including a resistive circuit element of resistance magnitude R2 and a capacitive circuit element of capacitance magnitude C, and a resistive circuit element having a variable resistance magnitude connected in series relation between said first and second circuits said magnitudes of said circuit elements conforming to the relation $$R_1=R_2=\sqrt{\frac{L}{C}}$$

whereby the frequency response of said network remains fixed irrespective of the magnitude of said variable resistance.

14. Apparatus in accordance with claim 13 wherein said variable resistance circuit element comprises a varistor.

15. A transmission network comprising, in combination, a two-terminal variable resistance element, a first circuit characterized by reactance of a first kind, a second circuit characterized by reactance of an opposite kind, means connecting one terminal of said resistance element to said first circuit, and means connecting the other terminal of said resistance element to said second circuit, said circuits being complementary as viewed from said resistance element, thereby rendering the over-all frequency response of said network invariant with respect to the magnitude of said variable resistance.

16. Apparatus in accordance with claim 15 wherein said variable resistance comprises a diode in shunt relation to said first and second circuits.

17. Apparatus in accordance with claim 15 wherein said variable resistance comprises a diode in series relation to said first and second circuits.

References Cited in the file of this patent

UNITED STATES PATENTS

| | | |
|---|---|---|
| 2,131,101 | Ferris | Sept. 27, 1938 |
| 2,246,293 | Collard | June 17, 1941 |
| 2,511,645 | Mahoney | June 13, 1950 |
| 2,864,903 | Becking et al. | Dec. 16, 1958 |
| 2,997,656 | Barlow | Aug. 22, 1961 |